US008031700B2

(12) United States Patent
Sumida

(10) Patent No.: US 8,031,700 B2
(45) **Date of Patent: *Oct. 4, 2011**

(54) PPP TERMINATING EQUIPMENT, NETWORK EQUIPMENT AND METHOD OF RESPONDING TO LCP ECHO REQUIREMENT

(75) Inventor: Koichi Sumida, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/647,077

(22) Filed: Dec. 24, 2009

(65) Prior Publication Data

US 2010/0098099 A1 Apr. 22, 2010

Related U.S. Application Data

(63) Continuation of application No. 11/766,432, filed on Jun. 21, 2007, now Pat. No. 7,664,104, which is a continuation of application No. 10/188,060, filed on Jul. 3, 2002, now Pat. No. 7,251,244.

(30) Foreign Application Priority Data

Jul. 4, 2001 (JP) ................................ 2001-203000

(51) Int. Cl.
*H04L 12/66* (2006.01)

(52) U.S. Cl. .................. 370/352; 370/395.2; 370/395.3

(58) Field of Classification Search .................. 370/352, 370/395.2, 395.21, 395.3, 420, 466, 252, 370/401, 469

See application file for complete search history.

(56) References Cited

U.S. PATENT DOCUMENTS 6,160,808 A 12/2000 Maurya
6,381,646 B2 4/2002 Zhang et al.
6,763,018 B1 7/2004 Puthiyandyil et al.
6,993,010 B1 * 1/2006 Peshkin ........................ 370/352
6,993,048 B1 1/2006 Ah Sue
2001/0043603 A1 11/2001 Yu
2002/0167905 A1 * 11/2002 Wenzel et al. ................ 370/249

FOREIGN PATENT DOCUMENTS

EP 1 109 354 6/2001

(Continued)

OTHER PUBLICATIONS

Hayashi, "PPP Protocol and Format", Open Design CQ Publication, vol. 4, No. 2, Apr. 1, 1997, pp. 36-65.
Simson, "RFC:1661—The Point-to-Point Protocol (PPP)", Jul. 1994, pp. 1, 2, 36.

(Continued)

*Primary Examiner* — Jung Park
(74) *Attorney, Agent, or Firm* — Harrity & Harrity, LLP

(57) ABSTRACT

In a PPP terminating equipment connected with a switch fabric and terminating PPP link, the PPP terminating equipment has an LCP echo requirement detecting section detecting whether or not a received packet is the LCP echo requirement packet, and an LCP echo response producing section producing a response packet to the LCP echo requirement by rewriting the LCP header of the received LCP echo requirement packet. The PPP terminating equipment thereby produces and returns the response packet to the LCP echo requirement.

17 Claims, 7 Drawing Sheets

FOREIGN PATENT DOCUMENTS

| | | |
|---|---|---|
| JP | 62-029341 | 2/1987 |
| JP | 09-093263 | 4/1997 |
| JP | 10-112739 | 4/1998 |
| JP | 10-136025 | 5/1998 |
| JP | 2001-069297 | 3/2001 |
| JP | 2001-94623 | 4/2001 |

OTHER PUBLICATIONS

Co-pending U.S. Appl. No. 11/766,432, filed Jun. 21, 2007, entitled "PPP Terminating Equipment, Network Equipment and Method of Responding to LCP Echo Requirement", 31 pages.

* cited by examiner

20 LCP ECHO REQUIREMENT DETECTING SECTION
21
LCP ECHO DETECTING SECTION
22
NCP PROCESSING SECTION
23
PROCESSOR INTERFACE SECTION
PACKET OF NETWORK LAYER
LCP ECHO REQUIREMENT
MICROPROCESSOR 90
RECEIVED PACKET
RECEIVED LOGICAL CHANNEL NUMBER

40 LCP ECHO RESPONSE PRODUCING SECTION
41
MAGIC NUMBER CORRESPONDENCE COMPARING SECTION
42
LCP CODE REWRITING SECTION
43
MAGIC NUMBER WRITING SECTION
44
TRANSMISSION DESTINATION ADDING SECTION
45
PROCESSOR INTERFACE SECTION
LCP ECHO REQUIREMENT MESSAGE
RECEIVED LOGICAL CHANNEL NUMBER
LCP ECHO RESPONSE MESSAGE
ITS OWN SLOT NUMBER

FIG 6

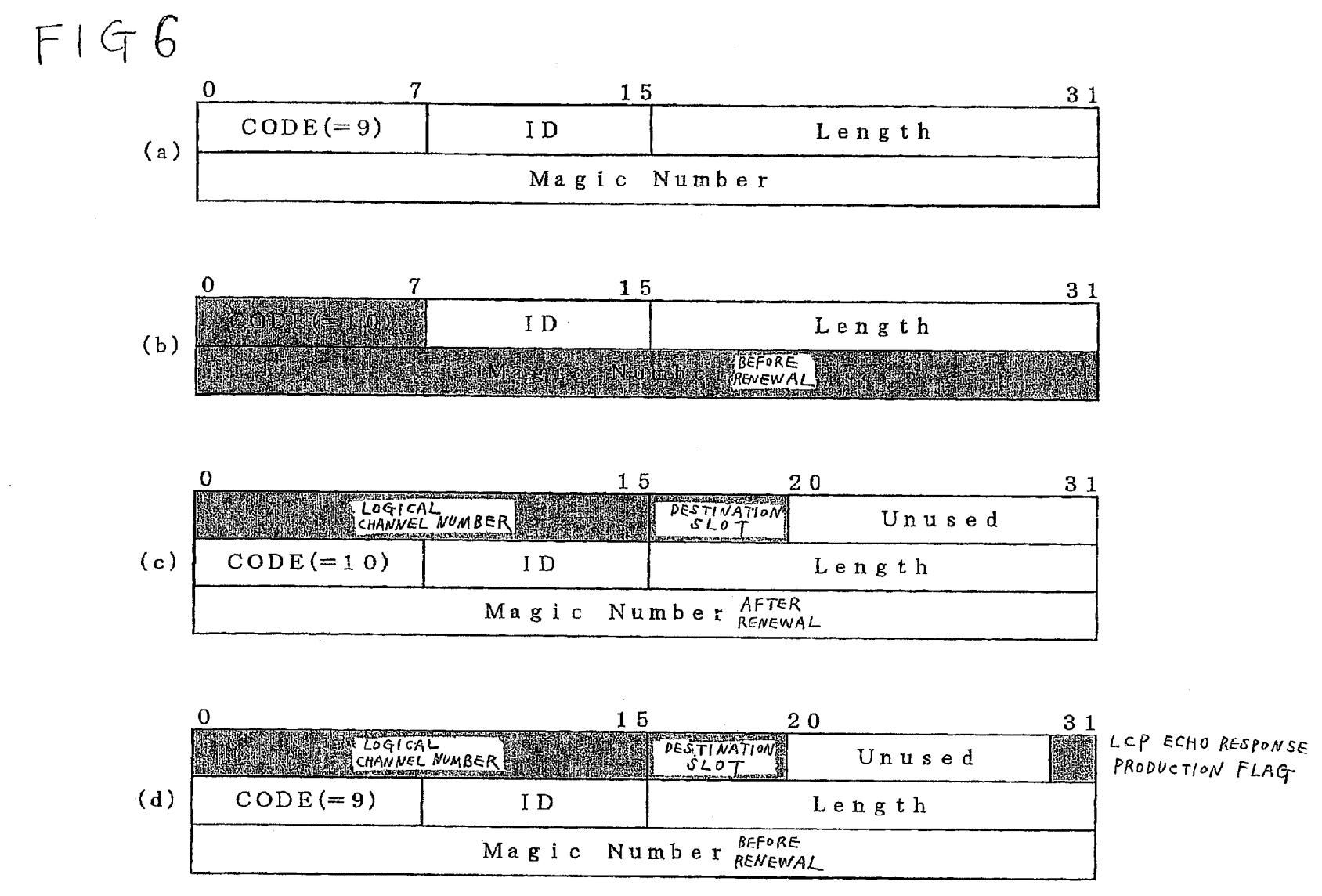

(a)
0 7 15 31
CODE(=9) ID Length
Magic Number (b)
0 7 15 31
CODE(=10) ID Length
Magic Number BEFORE RENEWAL (c)
0 15 20 31
LOGICAL CHANNEL NUMBER DESTINATION SLOT Unused
CODE(=10) ID Length
Magic Number AFTER RENEWAL (d)
0 15 20 31
LOGICAL CHANNEL NUMBER DESTINATION SLOT Unused LCP ECHO RESPONSE PRODUCTION FLAG
CODE(=9) ID Length
Magic Number BEFORE RENEWAL

PPP TERMINATING EQUIPMENT, NETWORK EQUIPMENT AND METHOD OF RESPONDING TO LCP ECHO REQUIREMENT

RELATED APPLICATIONS

This application is a continuation of U.S. patent application Ser. No. 11/766,432 filed Jun. 21, 2007 (now U.S. Pat. No. 7,664,104), which is a continuation of U.S. patent application Ser. No. 10/188,060 filed Jul. 3, 2002 (now U.S. Pat. No. 7,251,244), which are hereby incorporated by reference.

BACKGROUND OF THE INVENTION

The present invention relates to a PPP terminating equipment, and a network equipment, such as a router, and the like, in particular to the PPP terminating equipment and the network equipment both capable of rapidly processing a response to an LCP echo requirement, and a method of responding to the LCP echo requirement.

Conventionally, a PPP (Point-to-Point Protocol) terminating equipment has been mainly used, when a network equipment, such as a router, and the like is connected by the use of a PPP link.

Numbers of the PPP link terminals required for the PPP terminating equipment correspond to numbers of lines by 1 to 1 in a case of a non-multiple interface, such as POS (Packet over SONET), or the like. On the other hand, the PPP link can be established per each VPI/VCI (virtual path identifier/virtual channel identifier) or per each channel, in a case that a multiple interface, such as ATM (Asynchronous Transfer Mode), a channelized interface, or the like is contained. As a result, it becomes necessary that several thousands to several ten thousands number of the PPP links can be terminated by a single PPP terminating equipment.

Processing required for the PPP terminating equipment are divided into two major processing, namely, a processing of establishing a link and a processing of maintaining the link. The former, namely, the processing of establishing the link is such a processing that negotiates with the object of the link and decides and admits parameters required for connection of PPP.

On the other hand, the latter, namely, the processing of maintaining the link is, for example, a processing of response to LCP (Link Control Protocol) echo requirement packet transmitted and received at intervals of several seconds to confirm normality of the link, mainly after the PPP link has been established. An equipment that transmitted the LCP echo requirement judges the link to be invalid and disconnects the link, if any responses were not received from the opposite PPP terminating equipment during a predetermined certain time. Consequently, if the LCP echo requirement has been received, the PPP terminating equipment must give a response to the LCP echo requirement during the predetermined certain time by all means. Herein, numbers of the received LCP echo requirements are increased, when numbers of the links are many. Accordingly, a processing of responding to the LCP echo requirement is a large load on a processor.

In a conventional technique, the above-mentioned processing of responding to the LCP echo requirement is processed mainly by the use of a general purpose microprocessor. However, load on the general purpose microprocessor is increased, as numbers of connection of PPP are increased. For example, in the above-mentioned processing of establishing a link, it takes a longer time to finish the connection of all the links. In addition, even if the link has been established, only the PPP links of numbers corresponding to numbers of the LCP echo requirements capable of being processed by the general purpose microprocessor can be maintained. Thus, in the conventional technique, it is possible only to obtain the performance of processing far inferior to numbers of connection of PPP capable of being established in an actual multiple interface.

SUMMARY OF THE INVENTION

It is therefore an object of the present invention to provide a PPP terminating equipment, a network equipment, and a method of responding to an LCP echo requirement which have processing performance corresponding to numbers of connection of PPP capable of being contained in a side of line by a rapid LCP echo processing in a PPP terminating processing.

It is another object of the present invention to provide a PPP terminating equipment, a network equipment, and a method of responding to an LCP echo requirement of the type described which can realize a rapid LCP echo processing by a hardware control, although the LCP echo processing was conducted by a software control using a microprocessor.

Other objects of the present invention will become clear as the description proceeds.

According to an aspect of the present invention, there is provided a PPP terminating equipment which is connected with a switch fabric and which is for use in terminating PPP link, characterized in that, when the PPP terminating equipment receives an LCP echo requirement packet, the PPP terminating equipment produces and returns a response packet to the LCP echo requirement by rewriting an LCP header of the received LCP echo requirement packet.

The PPP terminating equipment may comprise:

LCP echo requirement detecting means for detecting whether or not a received packet is the LCP echo requirement packet; and LCP echo response producing means for producing a response packet to the LCP echo requirement by rewriting the LCP header of the received LCP echo requirement packet.

The PPP terminating equipment may be characterized in that, the PPP terminating equipment, when the received packet is the LCP echo requirement packet, produces the response packet to the LCP echo requirement by rewriting the LCP header of the received LCP echo requirement packet;

transmits the produced the response packet to the switch fabric with the PPP terminating equipment being designated as a destination; and upon receiving the transmission of the response packet from the switch fabric, transmits the response packet to a response destination of the LCP echo requirement.

The PPP terminating equipment may be characterized in that, the PPP terminating equipment, when the received packet is the LCP echo requirement packet, establishes an LCP echo response flag on the LCP echo requirement packet, the LCP echo response flag being for indicating the LCP echo response producing means to produce a response packet to the LCP echo requirement, transmits the produced the response packet to the switch fabric with the PPP terminating equipment being designated as a destination;

the LCP echo response producing means detect whether or not the LCP echo response flag is established in a packet transmitted from the switch fabric;

when the LCP echo response flag is established in the packet transmitted from the switch fabric, produces the response packet by rewriting the LCP header of the packet and transmits the response packet to the response destination of the LCP echo requirement.

The LCP echo response producing means may produce the response packet to the LCP echo requirement by rewriting a value of CODE field of the LCP header of the received LCP echo requirement packet from “9” indicating the LCP echo requirement packet into “10” indicating the response packet.

According to another aspect of the present invention, there is also provided a network equipment comprising a plurality of PPP terminating equipments terminating PPP link and connected with a switch fabric, characterized in that, when an LCP echo requirement packet is received, each of the a plurality of PPP terminating equipments produces and returns a response packet to the LCP echo requirement by rewriting an LCP header of the received LCP echo requirement packet.

Each of the a plurality of PPP terminating equipments may comprise:

LCP echo requirement detecting means for detecting whether or not a received packet is the LCP echo requirement packet; and LCP echo response producing means for producing a response packet to the LCP echo requirement by rewriting the LCP header of the received LCP echo requirement packet.

The network equipment may be characterized in that, each of the a plurality of PPP terminating equipments, when the received packet is the LCP echo requirement packet, produces the response packet to the LCP echo requirement by rewriting the LCP header of the received LCP echo requirement packet;

transmits the produced the response packet to the switch fabric with the PPP terminating equipment being designated as a destination; and upon receiving the transmission of the response packet from the switch fabric, transmits the response packet to a response destination of the LCP echo requirement.

The network equipment may be characterized in that, each of the a plurality of PPP terminating equipments, when the received packet is the LCP echo requirement packet, establishes an LCP echo response flag on the LCP echo requirement packet, the LCP echo response flag being for indicating the LCP echo response producing means to produce a response packet to the LCP echo requirement, transmits the produced the response packet to the switch fabric with the PPP terminating equipment being designated as a destination;

the LCP echo response producing means detect whether or not the LCP echo response flag is established in a packet transmitted from the switch fabric;

when the LCP echo response flag is established in the packet transmitted from the switch fabric, produces the response packet by rewriting the LCP header of the packet and transmits the response packet to the response destination of the LCP echo requirement.

The LCP echo response producing means of each of the a plurality of PPP terminating equipments may produce the response packet to the LCP echo requirement by rewriting a value of CODE field of the LCP header of the received LCP echo requirement packet from “9” indicating the LCP echo requirement packet into “10” indicating the response packet.

The network equipment may be a router.

According to yet another aspect of the present invention, there is also provided a method of responding to an LCP echo requirement in a PPP terminating equipment terminating PPP link, characterized in that, when the PPP terminating equipment receives an LCP echo requirement packet, the PPP terminating equipment produces and returns a response packet to the LCP echo requirement by rewriting an LCP header of the received LCP echo requirement packet.

The method may comprise the steps of:

detecting LCP echo requirement by detecting whether or not a received packet is the LCP echo requirement packet; and producing LCP echo response by producing a response packet to the LCP echo requirement by rewriting the LCP header of the received LCP echo requirement packet.

The method may be characterized in that, when the received packet is the LCP echo requirement packet, produces the response packet to the LCP echo requirement by rewriting the LCP header of the received LCP echo requirement packet;

transmits the produced the response packet to the switch fabric with the PPP terminating equipment being designated as a destination; and upon receiving the transmission of the response packet from the switch fabric, transmits the response packet to a response destination of the LCP echo requirement.

The method may be characterized in that, when the received packet is the LCP echo requirement packet, establishes an LCP echo response flag on the LCP echo requirement packet, the LCP echo response flag being for indicating the LCP echo response producing means to produce a response packet to the LCP echo requirement, transmits the produced the response packet to the switch fabric with the PPP terminating equipment being designated as a destination;

the LCP echo response producing means detect whether or not the LCP echo response flag is established in a packet transmitted from the switch fabric;

when the LCP echo response flag is established in the packet transmitted from the switch fabric, produces the response packet by rewriting the LCP header of the packet and transmits the response packet to the response destination of the LCP echo requirement.

The producing LCP echo response step may further comprise the step of:

producing the response packet to the LCP echo requirement by rewriting a value of CODE field of the LCP header of the received LCP echo requirement packet from “9” indicating the LCP echo requirement packet into “10” indicating the response packet.

BRIEF DESCRIPTION OF THE DRAWINGS

FIG. 6 is a diagram for schematically showing a header format according to each embodiment of the present invention.

DETAILED DESCRIPTION OF THE PREFERRED EMBODIMENTS

Referring to FIGS. 1 through 6, description will proceed to a PPP terminating equipment, a network equipment, and a method of responding to an LCP echo requirement according to a first embodiment of the present invention. The first embodiment of the present invention is characterized in that a processing of LCP echo requirement message of the PPP link control processing in an equipment for providing connection using PPP is realized not by a processing of a microprocessor but by a processing of a hardware, namely, by carrying out rewrite of LCP header and aliasing by Switch Fabric.

Figure 1:
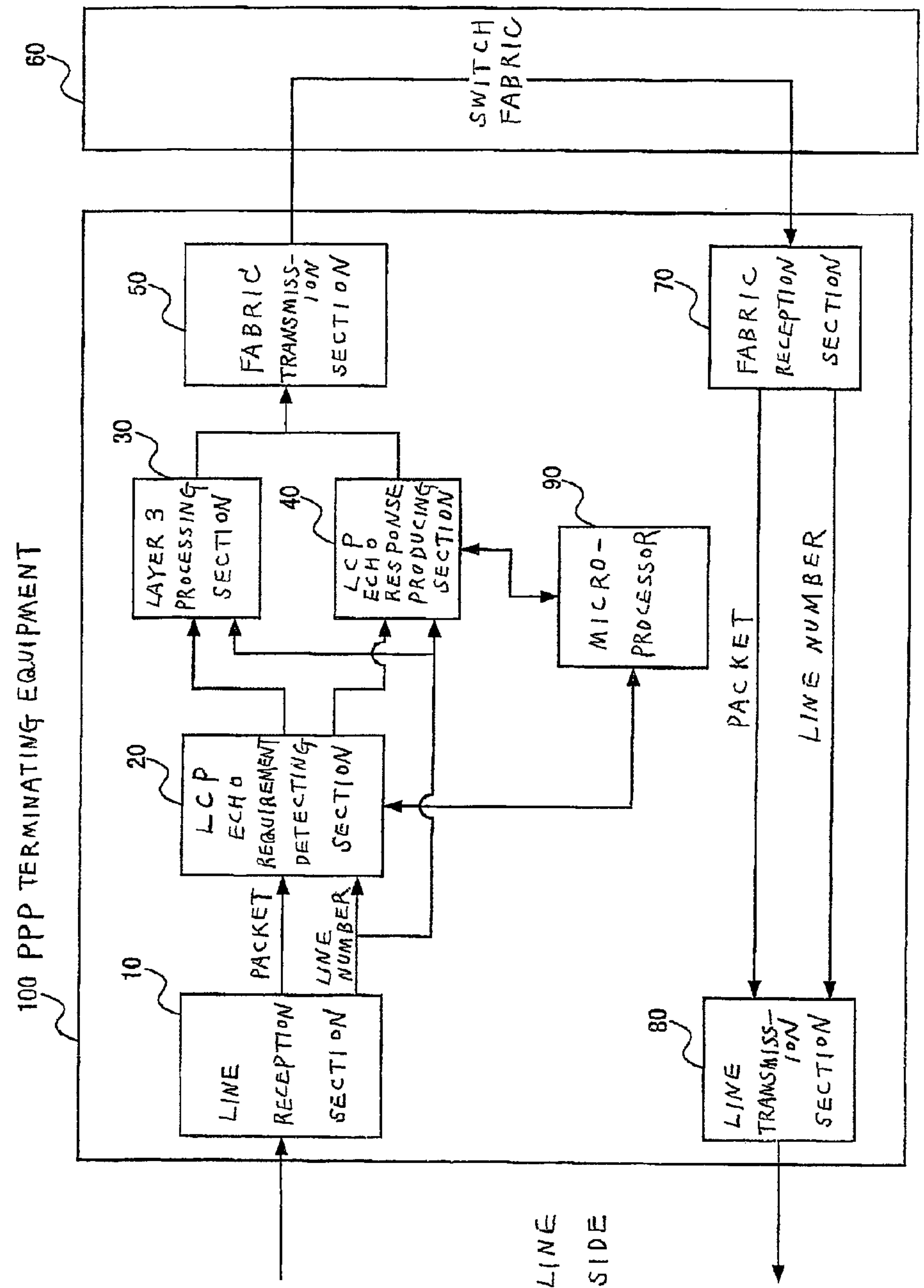
FIG. 1 is a block diagram for schematically showing a constitution of a PPP terminating equipment according to a first embodiment of the present invention.
Figure 2:
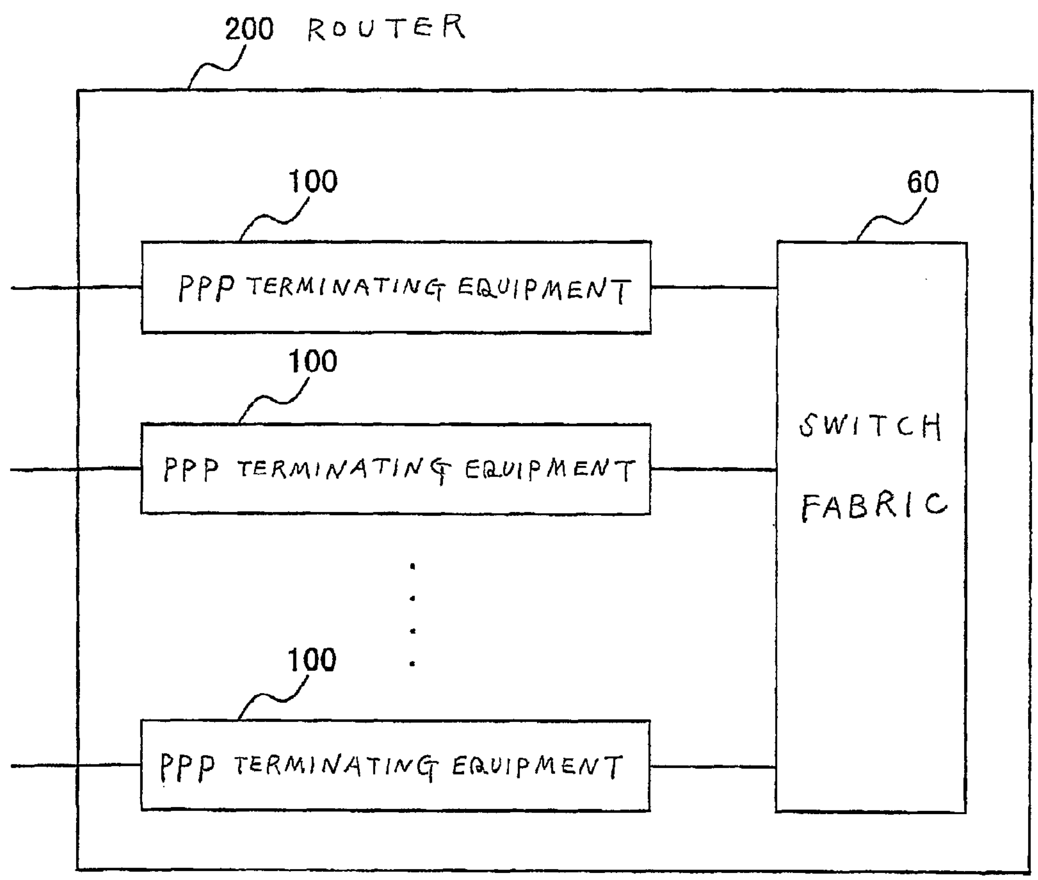
FIG. 2 is a block diagram for schematically showing a constitution of a router according to the first embodiment of the present invention.

FIG. 1 is a block diagram for schematically showing a constitution of a PPP terminating equipment 100 according to a first embodiment of the present invention. FIG. 2 is a block diagram for schematically showing a constitution of a router 200 according to this embodiment.

As illustrated in FIG. 2, the router 200 according to this embodiment has a constitution in which a plurality of PPP terminating equipments 100 according to this embodiment illustrated in FIG. 1 are mounted by way of the Switch Fabric 60. Each PPP terminating equipment 100 according to this embodiment contains a multiple line interface, such as an ATM, a channelized line, and the like and establishes PPP links per each logic line, such as VC, channel, and the like.

As illustrated in FIG. 1, the PPP terminating equipment 100 according to this embodiment comprises a line reception section 10 which receives packets from the outside, an LCP echo requirement detecting section 20 which detects an LCP echo requirement message from the received packets, a layer 3 processing section 30 which processes packets of a network layer (layer 3), an LCP echo response producing section 40 which rewrites the LCP echo requirement message to produce a response message, a fabric transmission section 50 which transmits data to the Switch Fabric 60, a fabric reception section 70 which receives data from the Switch Fabric 60, a line transmission section 80 which transmits packets to the outside, and a microprocessor 90 which controls processing in each section of the PPP terminating equipment 100.

The line reception section 10 contains a physical line and receives packets transmitted from the outside. The LCP echo requirement detecting section 20 receives packets and line numbers assembled per each logic line by the line reception section 10. Upon detecting an LCP echo requirement message from the received packets, the LCP echo requirement detecting section 20 transfers the LCP echo requirement message to the LCP echo response producing section 40. When the received message is an LCP echo requirement, the LCP echo response producing section 40 receives the message from the LCP echo requirement detecting section 20. The LCP echo response producing section 40 then produces an LCP echo response message by rewriting header information of the LCP echo requirement message. In other words, the LCP echo response producing section 40 changes a meaning of the message from the LCP echo requirement into the LCP echo response by rewriting header information of the message.

The fabric transmission section 50 and the fabric reception section 70 carry out transmission and reception of data with the Switch Fabric 60. In a case that the LCP echo response producing section 40 has produced an LCP echo response message, the fabric transmission section 50 transmits an indication signal with information of destination being added to the LCP header so that the Switch Fabric 60 may return the LCP echo response message to the destination of an interface (the destination of the PPP terminating equipment 100) through which the LCP echo requirement message is received.

Accordingly, the Switch Fabric 60 transfers the LCP echo response message to the same card (to the PPP terminating equipment 100) based on the information of destination added to the LCP header. As a result, the fabric reception section 70 receives the LCP echo response message. After the fabric reception section 70 has received the LCP echo response message, the line transmission section 80 transmits the LCP echo response message to a logic line number designated by the fabric reception section 70.

The microprocessor 90 controls the LCP echo requirement detecting section 20 and the LCP echo response producing section 40, as mentioned above, to process the LCP echo requirement, when the LCP echo requirement is received.

In addition to the above, the PPP terminating equipment 100 illustrated in FIG. 1 has the layer 3 processing section 30. When the received packets are such packets of a network layer, the layer 3 processing section 30 carries out solution of destination of packets based on destination addresses of the network layer. However, this is not directly related to the present invention. Detailed description about this is omitted accordingly.

Figure 3:
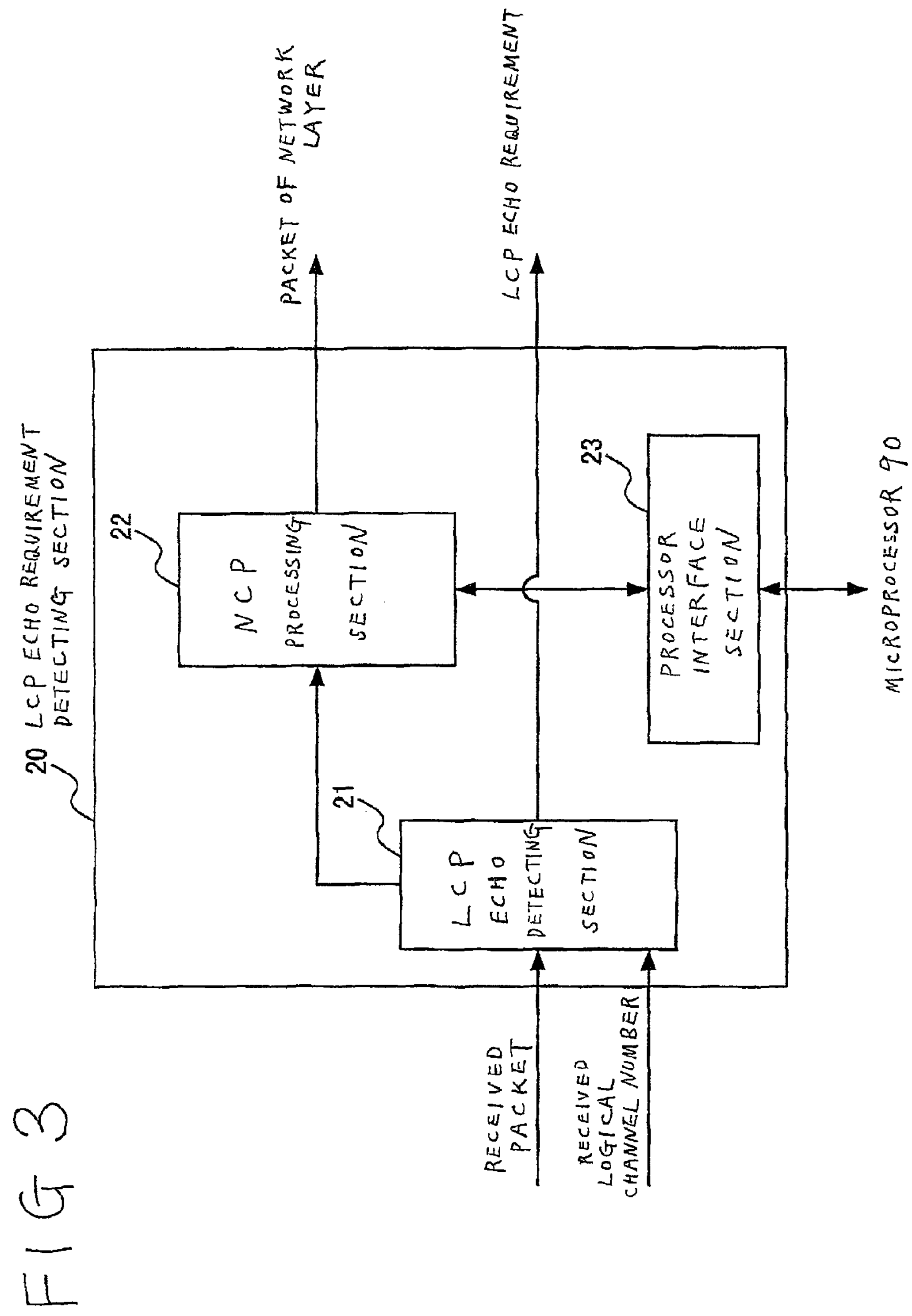
FIG. 3 is a block diagram for schematically showing a constitution of an LCP echo requirement detecting section according to the first embodiment of the present invention.

FIG. 3 is a block diagram for schematically showing a constitution of the LCP echo requirement detecting section 20 according to this embodiment of the present invention. As illustrated in FIG. 3, the LCP echo requirement detecting section 20 according to this embodiment comprises an LCP echo detecting section 21 which detects reception of an LCP echo requirement, an NCP processing section 22 which processes packets other than the LCP echo requirement, and a processor interface section 23 for connecting the LCP echo requirement detecting section 20 with the microprocessor 90.

The LCP echo detecting section 21 judges whether or not the packet received per each logic line is an LCP echo requirement. The LCP echo detecting section 21 judges the packet to be an LCP echo requirement by confirming that a value of CODE field of LCP header information is "9". The value of CODE field of LCP header information is "9" in a case of the LCP echo requirement packet while the value of CODE field of LCP header information is "10" in a case of a response packet to the LCP echo requirement. The LCP echo detecting section 21 transfers the packet to the LCP echo response producing section 40, when the packet is an LCP echo requirement.

The NCP processing section 22 receives LCP, NCP (Network Control Protocol), or a packet of a network layer other than the LCP echo requirement from the LCP echo detecting section 21. The NCP processing section 22 transfers all of the received LCP and NCP to the microprocessor 90, respectively. The NCP processing section 22 transfers the received packet of the network layer to the layer 3 processing section 30, only when NCP has been established. The microprocessor 90 controls the NCP processing section 22 through the processor interface section 23.

Figure 4:
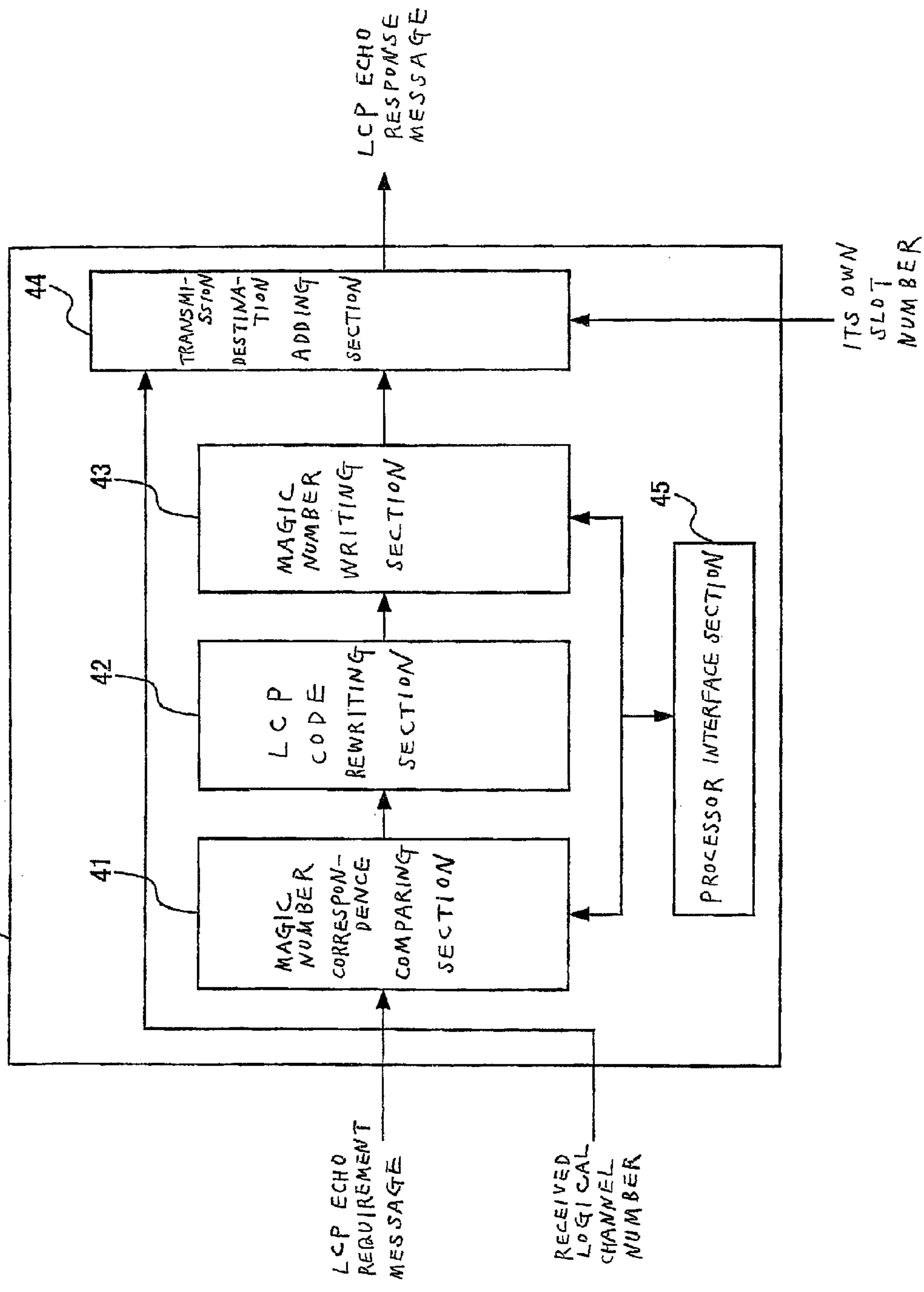
FIG. 4 is a block diagram for schematically showing a constitution of an LCP echo response producing section according to the first embodiment of the present invention.

FIG. 4 is a block diagram for schematically showing a constitution of the LCP echo response producing section 40 according to this embodiment of the present invention.

As illustrated in FIG. 4, the LCP echo response producing section 40 according to this embodiment comprises a magic number correspondence comparing section 41, an LCP CODE rewriting section 42, a magic number writing section 43, a transmission destination adding section 44, and a processor interface section 45.

The magic number correspondence comparing section 41 takes out Magic Number from a header of the LCP echo requirement packet input from the LCP echo requirement detecting section 20. The magic number correspondence comparing section 41 then compares the Magic Number with another Magic Number predetermined by a microprocessor.

The LCP CODE rewriting section 42 rewrites the value of CODE field of LCP header from "9" (LCP echo requirement) into "10" (response), only in a case that comparison of the Magic Numbers by the magic number correspondence comparing section 41 results in discord.

Herein, when the LCP CODE rewriting section 42 has rewritten the value of CODE field of LCP header, the magic number writing section 43 writes the same Magic Number as that predetermined by the microprocessor 90 and used by the magic number correspondence comparing section 41 for the above comparison in a magic number field of the LCP header. Further, the transmission destination adding section 44 produces information of transmission destination from a predetermined own slot number and logic line number of a packet. The transmission destination adding section 44 then adds the information of transmission destination to a head portion of a packet.

Further, the microprocessor 90 controls the magic number correspondence comparing section 41 and the magic number writing section 43 through the processor interface section 45. An initial value of the Magic Number is predetermined in the magic number correspondence comparing section 41 by the microprocessor 90.

Figure 5:
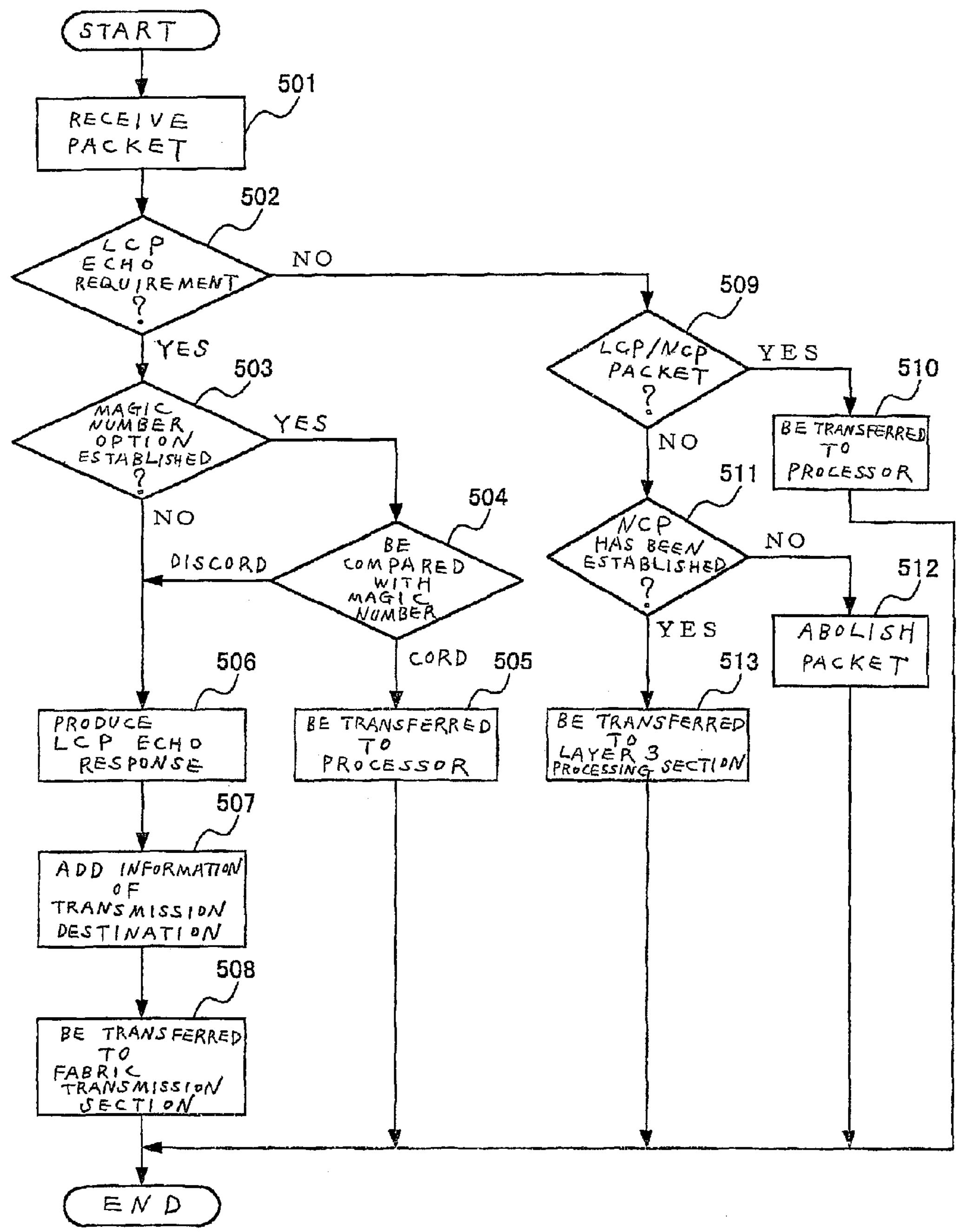
FIG. 5 is a flow chart for schematically explaining a rewrite processing according to the first embodiment of the present invention.

Next, referring to FIGS. 5 and 6, detailed description is made about operations according to this embodiment of the present invention. FIG. 5 is a flow chart for schematically explaining operations according to this embodiment of the present invention.

As illustrated in FIG. 5, at first, the line reception section 10 receives a packet from the outside (step 501). The LCP echo requirement detecting section 20 then investigates whether or not the received packet is an LCP echo requirement packet (step 502). As a result, when the received packet is the LCP echo requirement packet, the LCP echo response producing section 40 checks whether or not a Magic Number option has been established (step 503). In a case that the Magic Number option has been established, the LCP echo response producing section 40 compares a previously held Magic Number with a Magic Number of the received packet to judge whether or not the both Magic Numbers are identical with each other (step 504).

As a result, when the both Magic Numbers are identical with each other, it is likely that the received packet is a packet transmitted by its own PPP terminating equipment and the link is established to be a loop-back. The LCP echo response producing section 40 transfers the packet to the microprocessor 90 to be processed adequately at the side of the microprocessor 90 (step 505).

On the contrary, when the both Magic Numbers are not identical with each other, it is likely that the received packet is not a packet transmitted by its own PPP terminating equipment. Therefore, the link is deemed to be normal. The LCP echo response producing section 40 rewrites the LCP header (step 506).

FIG. 6 is a diagram for schematically explaining rewriting of a header format. FIG. 6(*a*) shows an LCP header before the rewriting is conducted. In FIG. 6(*a*), CODE is rewritten from "9" (LCP echo requirement) into "10" (response) while a number previously determined by a microprocessor is established to be the Magic Number. Accordingly, an LCP header after the rewriting is obtained, as illustrated in FIG. 6(*b*).

After the LCP echo response has been produced by the LCP echo response producing section 40, the transmission destination adding section 44 then adds a slot number and a logic line number of a destination to a head portion of the LCP header (step 507). A header format at this time is depicted in FIG. 6(*c*). Herein, an input logic line number received from the line reception section 10 is established to the logic line number. On the other hand, a line slot number identical with a line slot number at the timing when a packet is received is established to the slot number.

Thereafter, the fabric transmission section 50 which has received the above packet sends the packet to the Switch Fabric 60 with being directed to its slot. Further, the fabric reception section 70 which has received the packet from the Switch Fabric 60 makes the line transmission section 80 output an LCP echo response with the logic line number abstracted from the LCP header being designated.

Besides, when the received packet is not an LCP echo requirement packet in the above step 502, the LCP echo response producing section 40 checks whether or not the packet is an LCP packet or an NCP packet (step 509). In a case that the packet is an LCP packet or an NCP packet, the LCP echo response producing section 40 transfers the packet to the microprocessor 90 to be processed at the side of the microprocessor 90 (step 510).

Further, when the received packet is the other packet, namely, a packet of a network layer, the LCP echo response producing section 40 checks whether or not NCP condition has been established (step 511). In a case that the NCP condition has already been established, the LCP echo response producing section 40 transfers the packet to the layer 3 processing section 30 (step 513). The layer 3 processing section 30 processes the packet based on information of the network layer. On the contrary, in a case that the NCP condition has not been established, the LCP echo response producing section 40 abolishes the packet (step 512).

As described above, the PPP terminating equipment 100 according to this embodiment produces LCP echo requirement response message to carry out the response processing by rewriting header information of a received LCP echo requirement itself. Furthermore, also an LCP packet and an NCP packet other than the LCP echo requirement can be processed adequately. Moreover, also a loop back packet can be detected in view of Magic Number to be processed adequately. Therefore, it becomes unnecessary for a microprocessor to carry out a complicated computer program for processing of an echo requirement response. Load of processing on the microprocessor can be largely reduced. It is thereby possible to increase numbers of PPP links capable of being maintained simultaneously in the PPP terminating equipment.

Figure 7:
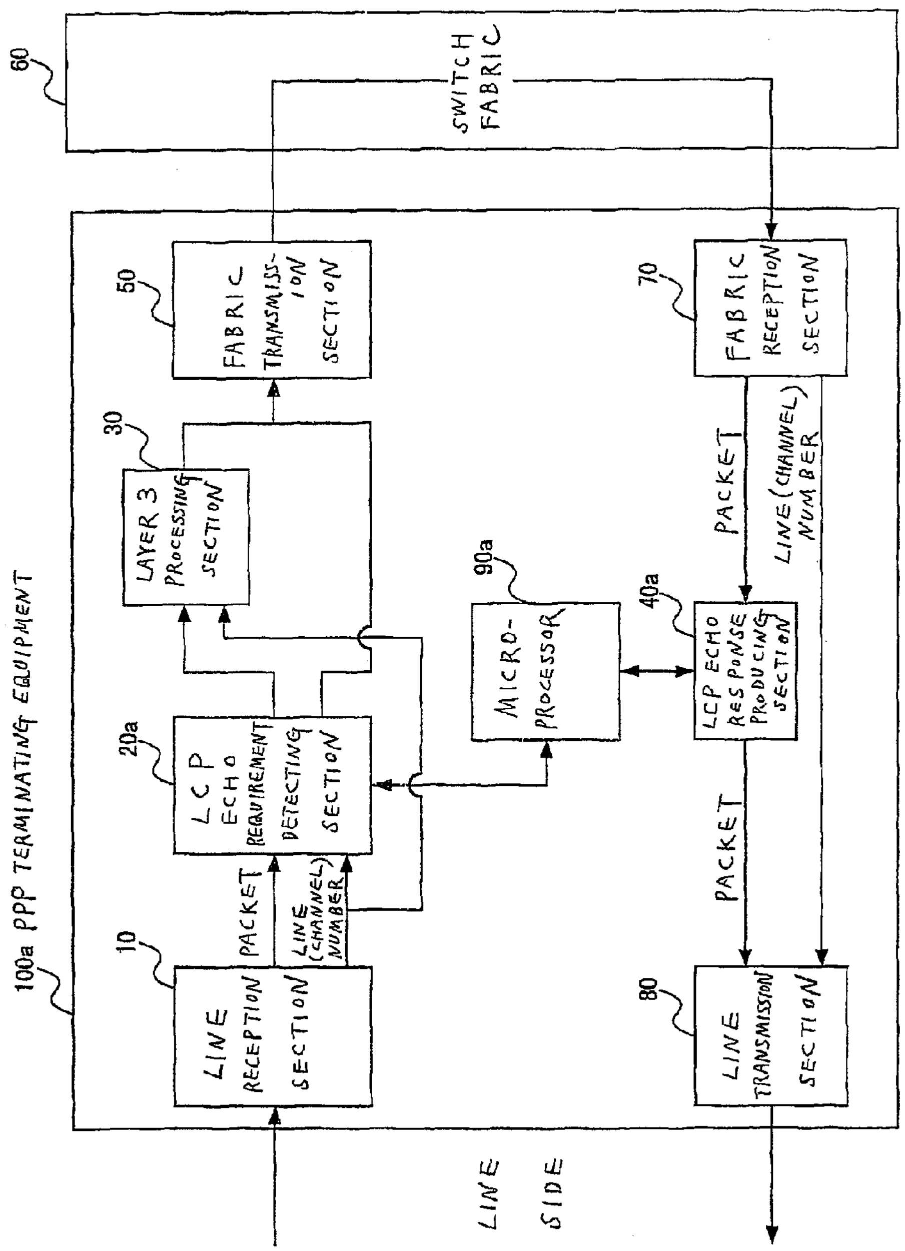
FIG. 7 is a block diagram for schematically showing a constitution of a PPP terminating equipment according to a second embodiment of the present invention.

Next, referring to FIGS. 6 and 7, description will proceed to a PPP terminating equipment according to a second embodiment of the present invention. FIG. 7 is a block diagram for schematically showing a constitution of the PPP terminating equipment according to the second embodiment of the present invention.

In the first embodiment mentioned above, the LCP echo response producing section 40 was located at the reception side of the line. In this embodiment illustrated in FIG. 7, an LCP echo response producing section 40*a* is alternatively located at the transmission side of the line. However, meritorious effects similar to those of the first embodiment can be obtained in this constitution illustrated in FIG. 7.

However, even in the alternative case, it is necessary that a function of the transmission destination adding section 44 of the first embodiment for adding information of transmission destination to a packet and a function to establish flag information for indicating the output side to produce a response packet are given at the reception side of the line. In this embodiment illustrated in FIG. 7, these functions are provided in an LCP echo requirement detecting section 20*a*. In this case, LCP header format output by the LCP echo requirement detecting section 20*a* is illustrated in FIG. 6 (*d*).

Then, the LCP echo response producing section 40*a* in this embodiment illustrated in FIG. 7 detects whether or not flag information for indicating a production of a response packet is included in a packet sent from the reception side of the line through the Switch Fabric 60. When the flag information is included in the packet, the LCP echo response producing section 40*a* rewrites the value of CODE field of LCP header from "9" (LCP echo requirement) into "10" (response), similarly to the LCP echo response producing section 40 of the first embodiment. Further, the LCP echo response producing section 40*a* carries out necessary processing for the Magic Number. The LCP echo response producing section 40*a* thereby rewrites the LCP header to produce a response packet.

According to the PPP terminating equipment, the network equipment, and the method of responding to an LCP echo requirement of the present invention, the following advantageous effects can be achieved.

A response processing to an LCP echo requirement packet received from a line interface can be carried out without imposing a load on a microprocessor for controlling the PPP terminating equipment or the network equipment. The reason is as follows. It is not necessary to transfer the received LCP echo requirement, and the like to the side of the microprocessor, in order to carry out a sequence of processing, a production of a response packet to the received LCP echo requirement, and the like. The sequence of processing, the production of a response packet to the received LCP echo requirement, and the like can be carried out by a processing of a hardware, namely, by carrying out rewrite of LCP header and aliasing by Switch Fabric. Further, the above processing of the hardware can be readily processed at real time with a general line speed. Accordingly, more numbers of PPP links can be maintained than a conventional PPP terminating equipment or network equipment without reducing the processing performance.

While this invention has thus far been described in conjunction with only two embodiments thereof, it will now be readily possible for one skilled in the art to put this invention into effect in various other manners. For example, in each of the first and the second embodiments mentioned above, description was made about the cases that the PPP terminating equipment is applied to a router as a network equipment. However, the present invention is not restricted to such cases. Namely, the PPP terminating equipment of the present invention can be applied to network equipment other than the router, such as a repeater, or the like.

What is claimed is:

1. A method comprising:

receiving a first packet at a network device;

determining that the first packet is a Link Control Protocol (LCP) echo requirement packet;

determining that the first packet was not sent by the network device;

producing an LCP echo response packet upon determining that the first packet is an LCP echo requirement packet and that the first packet was not sent by the network device;

receiving, at the network device, a second packet that includes flag information, the flag information indicating whether an LCP echo response packet is to be produced;

extracting the flag information from the second packet;

determining that the flag information indicates that an LCP echo response packet is to be produced; and producing a second LCP echo response packet, for the second packet, based on the extracted flag information.

2. The method of claim 1, where the producing the LCP echo response packet includes:

rewriting a field in a header of the LCP echo requirement packet to convert the LCP echo requirement packet to the LCP echo response packet.

3. The method of claim 2, where the field of the header corresponds to a CODE field.

4. The method of claim 1, where the determining that the first packet was not sent by the network device includes:

extracting a number from the first packet, and determining that the extracted number is not identical to a second number associated with the network device.

5. The method of claim 1, further comprising:

sending the LCP echo response packet to a switch fabric;

receiving the LCP echo response packet from the switch fabric; and sending the received LCP echo response packet toward a destination external to the network device.

6. The method of claim 1, further comprising:

receiving a third packet;

determining that the third packet is an LCP echo requirement packet;

determining that the third packet was sent by the network device; and discarding, in response to determining that the third packet is an LCP echo requirement packet and that the third packet was sent by the network device, the third packet without producing an LCP echo response packet for the third packet.

7. The method of claim 6, where the determining that the third packet was sent by the network device includes:

extracting a number from the third packet, and determining that the extracted number is identical to a second number associated with the network device.

8. A network device comprising:

a switch fabric; and

Point-to-Point Protocol (PPP) terminating equipment to:

receive a first packet from the switch fabric, determine that the first packet is a Link Control Protocol (LCP) echo requirement packet, determine that the first packet was not sent by the network device, produce an LCP echo response packet upon determining that the first packet is an LCP echo requirement packet and that the first packet was not sent by the network device, receive a second packet, determine that the second packet is an LCP echo requirement packet, determine that the second packet was sent by the network device, and discard, in response to determining that the second packet is an LCP echo requirement packet and that the second packet was sent by the network device, the second packet without producing an LCP echo response packet for the second packet.

9. The network device of claim 8, where, when producing the LCP echo response packet, the PPP terminating equipment is to:

rewrite a field in a header of the LCP echo requirement packet to convert the LCP echo requirement packet to the LCP echo response packet.

10. The network device of claim 9, where the field of the header corresponds to a CODE field.

11. The network device of claim 8, where, when determining that the first packet was not sent by the network device, the PPP terminating equipment is to:

extract a number from the first packet, and determine that the extracted number is not identical to a second number associated with the network device.

12. The network device of claim 8, where the PPP terminating equipment is further to:

send the LCP echo response packet to the switch fabric;

receive the LCP echo response packet from the switch fabric; and send the received LCP echo response packet toward a destination external to the network device.

13. The network device of claim 8, where, when determining that the second packet was sent by the network device, the PPP terminating equipment is to:

extract a number from the second packet, and determine that the extracted number is identical to a second number associated with the network device.

14. The network device of claim 8, where the PPP terminating equipment is further to:

receive a third packet that includes flag information, the flag information indicating whether an LCP echo response packet is to be produced, extract the flag information from the third packet, determine that the flag information indicates that an LCP echo response packet is to be produced, and produce a second LCP echo response packet, for the third packet, based on the extracted flag information.

15. A system comprising:

a network device to:

receive a packet;

determine that the packet is a Link Control Protocol (LCP) echo requirement packet;

determine that the packet was not sent by the network device;

produce an LCP echo response packet upon determining that the packet was not sent by the network device;

receive a second packet;

determine that the second packet is an LCP echo requirement packet;

determine that the second packet was sent by the network device; and discard, in response to determining that the second packet is an LCP echo requirement packet and that the second packet was sent by the network device, the second packet without producing an LCP echo response packet for the second packet.

16. The system of claim 15, where when producing the LCP echo response packet, the network device is to:

rewrite a field in a header of the LCP echo requirement packet to convert the LCP echo requirement packet to the LCP echo response packet.

17. The system of claim 15, where when determining that the second packet was sent by the network device, the network device is to:

extract a number from the second packet, and determine that the extracted number is identical to a second number associated with the network device.

* * * * *